US011902361B2

(12) United States Patent
Janovsky et al.

(10) Patent No.: US 11,902,361 B2
(45) Date of Patent: Feb. 13, 2024

(54) ROUTING PROVIDER QUEUES

(71) Applicant: Twilio Inc., San Francisco, CA (US)

(72) Inventors: Peter Michael Janovsky, Pleasanton, CA (US); Marcus Carlsson, Malmo (CH); Andrei Osochenko, Tallinn (EE)

(73) Assignee: Twilio Inc., San Francisco, CA (US)

( * ) Notice: Subject to any disclaimer, the term of this patent is extended or adjusted under 35 U.S.C. 154(b) by 0 days.

(21) Appl. No.: 17/558,572

(22) Filed: Dec. 21, 2021

(65) Prior Publication Data
US 2022/0224632 A1 Jul. 14, 2022

Related U.S. Application Data

(60) Provisional application No. 63/135,367, filed on Jan. 8, 2021.

(51) Int. Cl.
*H04L 67/1008* (2022.01)
*H04L 47/122* (2022.01)
*H04L 45/00* (2022.01)
*H04L 45/42* (2022.01)

(52) U.S. Cl.
CPC .......... *H04L 67/1008* (2013.01); *H04L 45/38* (2013.01); *H04L 45/42* (2013.01); *H04L 47/122* (2013.01)

(58) Field of Classification Search
CPC ..... H04L 67/1008; H04L 45/38; H04L 45/42; H04L 47/122; H04L 67/63
See application file for complete search history.

(56) References Cited

U.S. PATENT DOCUMENTS

| | | | | |
|---|---|---|---|---|
| 7,408,876 B1* | 8/2008 | Gupta | ............... | H04L 47/10 |
| | | | | 370/413 |
| 8,509,069 B1* | 8/2013 | Poon | ............... | H04L 49/254 |
| | | | | 370/413 |
| 10,382,380 B1* | 8/2019 | Suzani | ............ | H04L 47/629 |
| 2013/0297770 A1* | 11/2013 | Zhang | ........... | H04L 67/1023 |
| | | | | 709/224 |
| 2015/0163161 A1* | 6/2015 | Arikatla | ......... | H04L 67/1008 |
| | | | | 709/226 |
| 2021/0176171 A1* | 6/2021 | Frink | ................ | G06F 9/4887 |

\* cited by examiner

*Primary Examiner* — Abdulkader M Alriyashi
(74) *Attorney, Agent, or Firm* — LOWENSTEIN SANDLER LLP

(57) ABSTRACT

Disclosed are systems, methods, and non-transitory computer-readable media for routing provider queues. A message routing system receives a request to transmit a message to a destination device and selects a first routing provider from a plurality of routing providers that each have a separate message queue of a plurality of message queues, wherein the first routing provider is selected based on one or more characteristics of each of the plurality of routing providers. The message routing system adds the message into a first message queue designated to the first routing provider, and causes the message to be dequeued from the first message queue to the first routing provider for delivery to the destination device.

18 Claims, 7 Drawing Sheets

ROUTING PROVIDER QUEUES

CROSS-REFERENCE TO RELATED APPLICATIONS

This application claims the benefit of priority of U.S. Provisional Application No. 63/135,367, filed on Jan. 8, 2021, which is incorporated herein by reference in its entirety.

TECHNICAL FIELD

An embodiment of the present subject matter relates generally to message routing and, more specifically, to routing provider queues.

BACKGROUND

Messaging systems sometimes utilize multiple routing providers to deliver messages. For example, messaging systems may select from the routing providers based on price and/or performance. Current systems utilize a single queue to handle message allocation to the various routing providers. Messages in the queue are allocated to the appropriate routing provider in the order in which they were added to the queue. The routing provider that receives the allocated message may either accept or reject the message based on their current throughput. Messages that are rejected are added back to the queue, resulting in unwanted delay and unnecessary resource usage. Accordingly, improvements are needed.

SUMMARY

A message routing system uses individual routing provider queues assigned to each routing provider to allocate messages to the routing providers. To alleviate the issue of unwanted delay associated with previous systems that use a single queue to allocate messages to multiple routing providers, the message routing system allocates messages to each routing provider from a routing provider queue designated to the specific routing provider. To further improve performance, the message routing system allocates the messages to each routing provider in response to receiving requests from the routing provider indicating that throughput is available. This ensures that the routing provider has adequate capacity to handle each allocated message and no additional delay is introduced.

Use of the routing provider queues further allows for the congestion of each routing provider to be monitored by the message routing system. Current systems generally gauge performance of a routing provider based on whether messages transmitted by the routing provider were successfully delivered. While this does provide insight into whether a message is likely to be successfully delivered, it does not provide any insight into congestion associated with the routing provider that may cause a delay in the message being delivered. The message routing system monitors the speed or rate at which messages from each routing provider queue are allocated to the routing providers to estimate the congestion level being experienced by each routing provider. The message routing system may use this estimated congestion level as an input when selecting a routing provider to deliver a message.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for routing provider queues. A message routing system uses individual routing provider queues assigned to each routing provider to allocate messages to the routing providers. For example, the message routing system allocates messages to each routing provider from a routing provider queue designated to the specific routing provider. Routing providers request that messages be allocated from their designated routing provider queue based on capacity, thereby ensuring that the routing provider has adequate capacity to handle each allocated message. Use of the routing provider queues further allows for the congestion of each routing provider to be monitored by the message routing system, which may be used by the message routing system as an input when selecting a routing provider to deliver a message.

Figure 1:
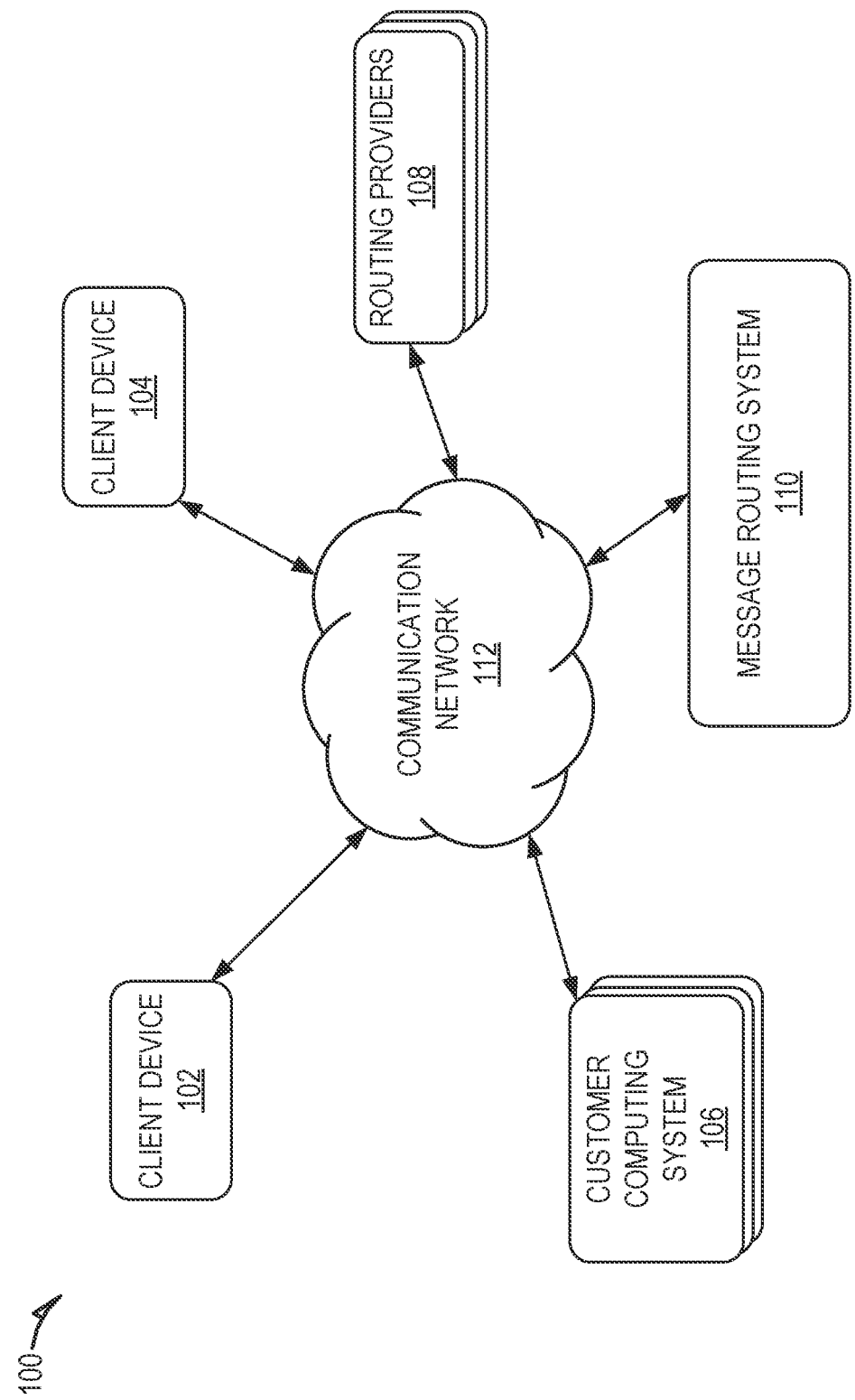
FIG. 1 shows a system for allocating messages using routing provider queues, according to some example embodiments.

FIG. 1 shows a system 100 for allocating messages using routing provider queues, according to some example embodiments. As shown, multiple devices (i.e., client device 102, client device 104, customer computing system 106, routing providers 108 and message routing system 110) are connected to a communication network 112 and configured to communicate with each other through use of the communication network 112. The communication network 112 is any type of network, including a local area network (LAN), such as an intranet, a wide area network (WAN), such as the internet, a telephone and mobile device network, such as cellular network, or any combination thereof. Further, the communication network 112 may be a public network, a private network, or a combination thereof. The communication network 112 is implemented using any number of communication links associated with one or more service providers, including one or more wired communication links, one or more wireless communication links, or any combination thereof. Additionally, the communication network 112 is configured to support the transmission of data formatted using any number of protocols.

Multiple computing devices can be connected to the communication network 112. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 700 shown in FIG. 7.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

The customer computing system 106 is one or more computing devices associated with a customer of the message routing system 110. A customer may be a person, business, company, and/or any other type of entity that uses the services provided by message routing system 110 to transmit communication messages to intended recipients. A communication message may be any of a variety of types of messages that are transmitted to a receiving client device 102 with the purpose of being presented to a user of the client device 102, such as by being displayed on a display of the client device 102. For example, a communication message may be a text-based message, such as a Short Message Service (SMS) message, a multimedia-based message, such as a Multimedia Messaging Service (MMS) message, and the like.

The customer may use the functionality of the message routing system 110 as part of a service provided by the customer. The customer may provide any type of service, such as a banking service, travel service, retail service, and the like. The service may be an online and/or offline service. That is, the service may be available only online, such as an online retailer, offline, such as a physical retailer, or both online and offline, such as a retailer that provides a website or application as well as a physical retail store.

The customer computing system 106 may facilitate any service of a customer that is provided online, such as a ride-sharing service, reservation service, retail service, news service, and the like. In these types of embodiments, users may interact with the customer computing system 106 to utilize the online service provided by the customer. Users communicate with and utilize the functionality of the customer computing system 106 by using the client devices 102 and 104 that are connected to the communication network 112 by direct and/or indirect communication. The customer computing system 106, however, does not have to provide an online service that is accessible to users. That is, the customer computing system 106 may simply be a computing system used by a customer to perform any type of functionality.

Although the shown system 100 includes only two client devices 102, 104 and one customer computing system 106, this is only for ease of explanation and is not meant to be limiting. One skilled in the art would appreciate that the system 100 can include any number of client devices 102, 104 and/or customer computing systems 106. Further, each customer computing system 106 may concurrently accept communications from and initiate communication messages and/or interact with any number of client devices 102, 104, and support connections from a variety of different types of client devices 102, 104, such as desktop computers; mobile computers; mobile communications devices, e.g., mobile phones, smart phones, tablets; smart televisions; set-top boxes; and/or any other network enabled computing devices. Hence, the client devices 102 and 104 may be of varying type, capabilities, operating systems, and so forth.

A user interacts with a customer computing system 106 via a client-side application installed on the client devices 102 and 104. In some embodiments, the client-side application includes a component specific to the customer computing system 106. For example, the component may be a stand-alone application, one or more application plug-ins, and/or a browser extension. However, the users may also interact with the customer computing system 106 via a third-party application, such as a web browser or messaging application, that resides on the client devices 102 and 104 and is configured to communicate with the customer computing system 106. In either case, the client-side application presents a user interface (UI) for the user to interact with the customer computing system 106. For example, the user interacts with the customer computing system 106 via a client-side application integrated with the file system or via a webpage displayed using a web browser application.

A customer may use a customer computing system 106 to cause transmission of communication messages (e.g., SMS messages) to intended recipients. For example, a customer computing system 106 may provide online functionality that enables users of the customer computing system 106 to transmit messages to agents of the customer and/or other users. As another example, the customer computing system 106 may transmits messages to users to provide the users with two-factor authentication, password resets, updates, links to content, promotions, etc.

Routing providers 108 provide message delivery functionality. For example, each routing provider 108 maintains communication routes that may be used to transmit messages to their intended recipient client devices 102, 104. A routing provider 108 may charge a customer a fee for each message of the customer that is delivered by the routing provider 108.

The system 100 may include any number of routing providers 108, each of which may provide varying levels of performance. For example, the likelihood that a message will be successfully delivered may vary among the routing providers 108 as well as the individual routes provided by the routing provides 108. Further, the performance of each routing provider 108 may vary over time. Accordingly, the likelihood that a message will be delivered successfully varies based on the routing provider 108 and/or route selected to deliver the message. As such, varying selection of the routing provider 108 based on performance may provide a higher overall likelihood that messages are successfully delivered.

The message routing system 110 provides functionality to optimize message routing performance for customers. For example, the message routing system 110 monitors performance of multiple routing providers 108 and allocates messages to the routing providers 108 to optimize message routing performance, such as by allocating messages to routing providers 108 that provide a high level of performance and/or low cost for delivery.

The message routing system 110 maintains a separate routing provider queue for each routing provider 108. Each routing provider queue is a queue that is designated to a specified routing provider 108 for use in allocating messages to the routing provider 108. For example, to allocate a message to a routing provider 108, the message routing system 110 adds the messages to the routing provider queue designated to the routing provider 108. Messages added to a routing provider queue are allocated to the routing provider 108 for delivery in a predefined order (e.g., a first-in-first-out (FIFO) order).

The message routing system 110 causes messages to be dequeued from message queues to respective routing providers 108. In some implementations, the message routing system 110 allocates messages to the routing providers 108 in response to receiving requests from the routing providers 108. For example, a routing provider 108 may transmit a request to the message routing system 110 to allocate a message to the routing provider 108 based on a current available bandwidth of the routing provider 108. This ensures that the routing provider 108 has available bandwidth to process a new message.

In response to receiving the request, the message routing system 110 allocates a message to the routing provider 108 from the routing provider queue that is designated to the routing provider 108. For example, the message routing system 110 dequeues the message from the routing provider queue and provides the message to the routing provider 108. Each message stored in the routing provider queue may include various data used to transmit the message to its intended recipient. For example, the message may include data identifying the sender, the recipient device, the body of the messages, media included in the message, and the like.

The message routing system 110 may further monitor performance of the routing provider queues to determine an estimated congestion level of each routing provider 108. For example, the message routing system 110 may monitor the rate at which requests are received from the routing providers 108 and/or the rate at which messages are allocated to the routing providers 108 from the routing provider queues to determine the estimated congestion level for each routing provider 108. Receiving requests from a routing provider 108 at a decreased rate may indicate an increase in congestion by the routing provider 108. As a result, messages allocated to the routing provider 108 for delivery may take a longer period of time to be delivered.

The message routing system 110 uses the estimated congestion level of each routing provider 108 as an input when selecting a routing provider 108 to deliver a message. The estimated congestion levels of the routing providers 108 may be considered along with other factors, such as the percentage of messages that are successfully delivered by the routing providers 108, the fee charged by each routing provider 108 to deliver a message, and the like.

Figure 2:
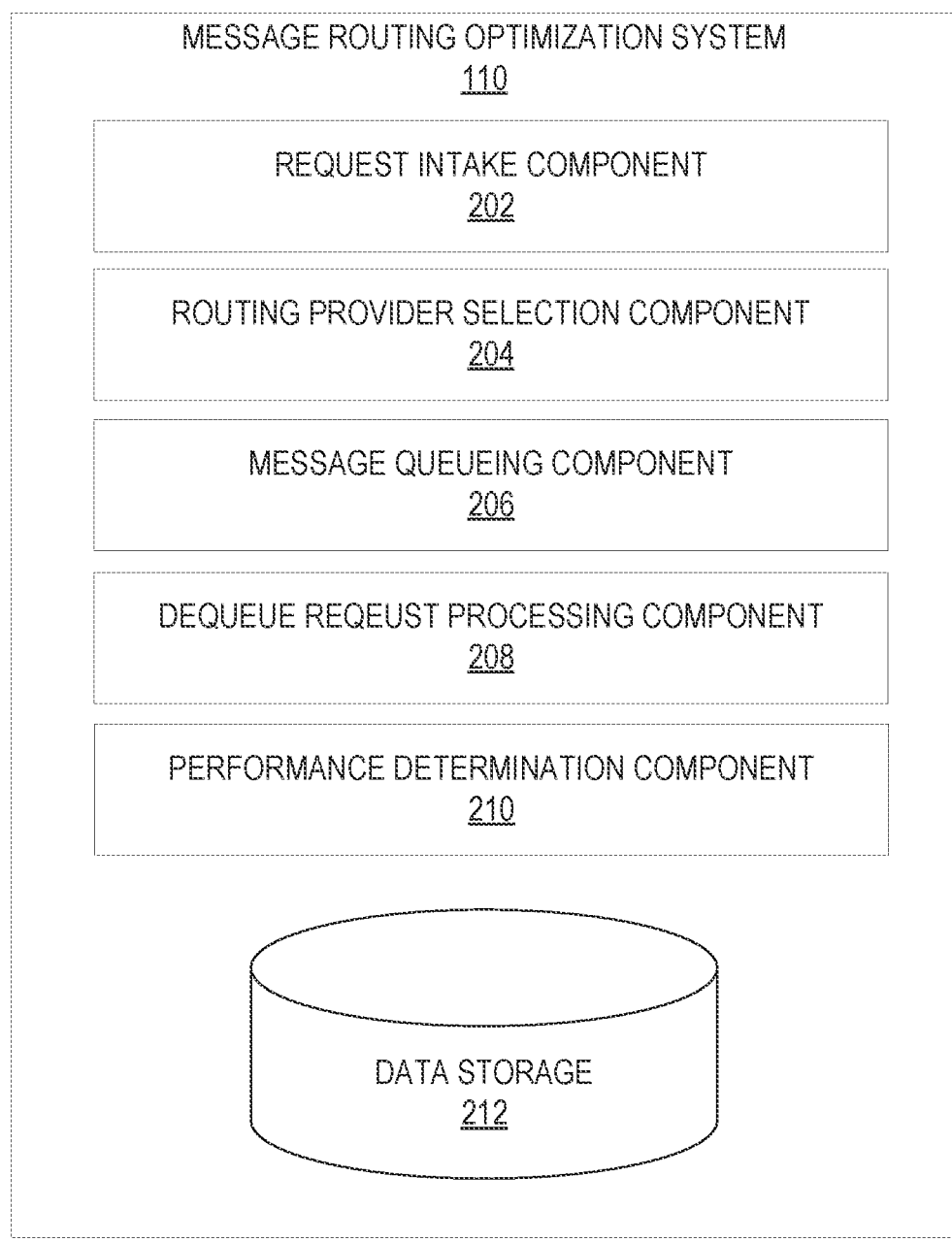
FIG. 2 is a block diagram of a message routing system, according to some example embodiments.

FIG. 2 is a block diagram of a message routing system 110, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the message routing system 110 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the message routing system 110 includes a request intake component 202, a routing provider selection component 204, a message queueing component 206, a dequeue request processing component 208, a performance determination component 210, and a data storage 212.

The request intake component 202 receives requests to deliver a message for a customer. For example, the request intake component 202 may receive the request from a customer computing system 106. The request may be transmitted as a result of a user utilizing the online functionality provided by the customer computing system 106. For example, a user may use a client device 102 to communicate with and utilize the functionality of the customer computing system 106, which may involve transmission of the message. For example, a user may request to login to an account, resulting in transmission of a message to provide two-factor authentication. As another example, a user may initiate transmitting a message to an agent of the customer or another user. Alternatively, the request may be transmitted by the customer computing system 106 to provide functionality that is not in direct response to a user use of an online service. For example, the request may be transmitted by the customer computing system 106 to provide promotional materials or updates to users.

The request may include data identifying the customer, data identifying the intended recipient, and/or a payload of the message. For example, the request may include a unique identifier assigned to the customer and/or the customer's account with the message routing system 110. The request may also include an identifier for the recipient of the message, such as a phone number associated with a recipient client device 102, an account of the message routing system 110 associated with the recipient, etc. The payload may include any of a variety of types of data, including text, images, rich media format of data and/or any combination of data formats but not limited to the above formats to be included in the message provided to the recipient.

The routing provider selection component 204 selects a routing provider 108 to deliver each message. The routing provider selection component 204 may select a routing provider based on various factors, such as the cost to deliver messages with each routing provider 108, a determined performance level of each routing provider 108, customer criteria, and the like. The determined performance level of each routing provider indicates a level at which each routing provider 108 is performing based on one or more metrics, such as how likely the routing provider 108 is to successfully deliver a message to its intended recipient, a congestion level of the routing provider 108, and the like. The customer criteria indicate preferences of the customer that is requesting to transmit the message. For example, the customer criteria may define a maximum price the customer is willing to pay to transmit messages, a minimum performance level for delivering the message, and the like.

The routing provider selection component 204 may gather the cost to deliver messages with each routing provider 108, the determined performance level of each routing provider 108, and/or the customer criteria from the data storage 212. The routing provider selection component 204 may then use the gathered data to select a routing provider 108 to deliver the message. For example, the routing provider selection component 204 may select a routing provider 108 that charges a cost that is below the maximum price that the customer is willing to pay and a provides a performance level that is greater than the minimum performance level defined by the customer. In some embodiments, the routing provider selection component 204 may select a routing provider 108 that provides an optimized value based on a combination of cost and performance level.

The routing provider selection component 204 provides the message queueing component 206 with data identifying the routing provider 108 that was selected to deliver the message. The message queueing component 206 adds the message to the routing provider queue designated to the selected routing provider 108. Adding the message to the routing provider queue may include adding data used to deliver the message, such as data identifying the source and recipient of the message. The message payload or an identifier identifying the location of the message payload may also be added to the routing provider queue. The message payload may include text to be transmitted as part of the message, as well as media or other content (e.g., voice, video, audio, etc.) to be included in the message.

Messages added to the routing provider queue are allocated to the routing provider 108 for delivery to their intended recipients. For example, the dequeue request processing component 208 receives dequeue requests from the routing providers 108. A dequeue request indicates that the routing provider 108 from which the dequeue request was received is ready to receive and process a new message. For example, a routing provider 108 may transmit a dequeue request when the available bandwidth of the routing provider 108 is greater than a threshold bandwidth. The dequeue request may include data identifying the routing provider 108 and/or the routing provider queue designated to the routing provider 108. For example, the dequeue request may include a unique identifier associated with the routing provider 108 and/or the routing provider queue.

In response to receiving a dequeue request, the dequeue request processing component 208 allocates a message to the routing provider 108 from the routing queue designated to the routing provider 108. For example, the dequeue request processing component 208 uses the identifier included in the dequeue request to identify the routing provider queue designated to the routing provider 108 and then dequeues a message from the routing provider queue. Messages are dequeued from the routing provider queue in the order in which they were added to the routing provider queue. The dequeue request processing component 208 then provides the dequeued message to the routing provider 108 for delivery to its intended recipient.

The performance determination component 210 determines the performance levels of the routing providers 108 based on various data. For example, the performance determination component 210 may determine the performance levels based on feedback data indicating whether messages transmitted by the routing providers 108 were successfully delivered as well as data describing performance of the routing provider queues designated to the routing providers.

The performance determination component 210 may receive feedback data from the routing providers 108 and/or customer computing systems 106 indicating whether the messages allocated to the routing providers 108 were successfully delivered to their intended recipient devices (e.g., successfully received by the intended recipient devices). The performance determination component 210 may use the received feedback data to calculate a conversion rate for each routing provider 108. The conversion rate may indicate the percentage of messages allocated to a routing provider 108 that were successful delivered. The performance determination component 210 may calculate the conversion rate for a routing provider 108 based on all of the feedback data associated with the routing provider 108 or a subset of the feedback data. For example, the performance determination component 210 may calculate the conversion rate using a sliding window of the feedback data, such as the feedback data received within a previous two-hour window. Using a sliding window of the feedback data to calculate the conversion rate results in a conversion rate that better represents a routing provider's 108 current performance.

In addition to calculating a conversion rate for each routing provider 108, the performance determination component 210 may also determine a current congestion level of each routing provider 108. The current congestion level for each routing provider 108 indicates a current throughput or available bandwidth of the routing provider 108. For example, a high congestion level may indicate that the routing provider 108 has a low throughput or available bandwidth that may result in an increase in latency related to delivering messages. Alternatively, a low congestion level may indicate that the routing provider 108 has a high throughput or available bandwidth such that messages allocated to the routing provider 108 are delivered quickly or with minimal latency.

The performance determination component 210 determines the congestion level of each routing provider 108 by monitoring the routing provider queue designated to each routing provider 108. For example, the performance determination component 210 may monitor the rate at which messages are dequeued from each routing provider queue and/or the rate at which dequeue requests are received for each routing provider queue. The performance determination component 210 uses this rate to determine the current congestion level of the corresponding routing provider 108. For example, a decreased or lower rate at which messages are dequeued from the routing provider queue may indicate that the routing provider 108 is experiencing an increase in congestion. As another example, an increase or higher rate at which messages are dequeued from the routing provider queue may indicate that the routing provider 108 is experiencing a decreasing and/or low level of congestion.

As the congestion level of each routing provider 108 may change quickly due to various factors, the performance determination component 210 may use recent data to determine a current congestion level of each routing provider 108. For example, the performance determination component 210 may determine the congestion level of each routing provider 108 based on sliding window of data, such as data gathered within a previous ten minutes. Using a sliding window provides an accurate reflection of the current congestion level being experienced by each routing providers 108, which increases the performance of the message routing system 110 when allocating messages to a routing provider 108.

The performance determination component 210 determines the performance level of each routing provider 108 based on a combination of the conversion rate and the congestion rate of the routing provider 108. For example, the performance determination component 210 may calculate a score indicating the performance level of each provider 108 based on the conversion rate and the congestion rate of the routing provider 108. The performance determination component 210 may calculate the performance level using any of a variety of algorithms. For example, the performance determination component 210 may use the current congestion level of a routing provider 108 as a weight value applied to the conversion rate of the routing provider 108. This is just one example and is not meant to be limiting. The performance determination component 210 may calculate the performance level in any of a variety of ways.

The performance determination component 210 may store the performance level of each routing provider 108 in the data storage 212. The stored performance levels may be accessed from the data storage 212 by other components of the message routing system 110. For example, the routing provider selection component 204 may access the performance levels of the routing providers 108 from the data storage 212 when allocating messages to the routing providers 108.

Figure 3:
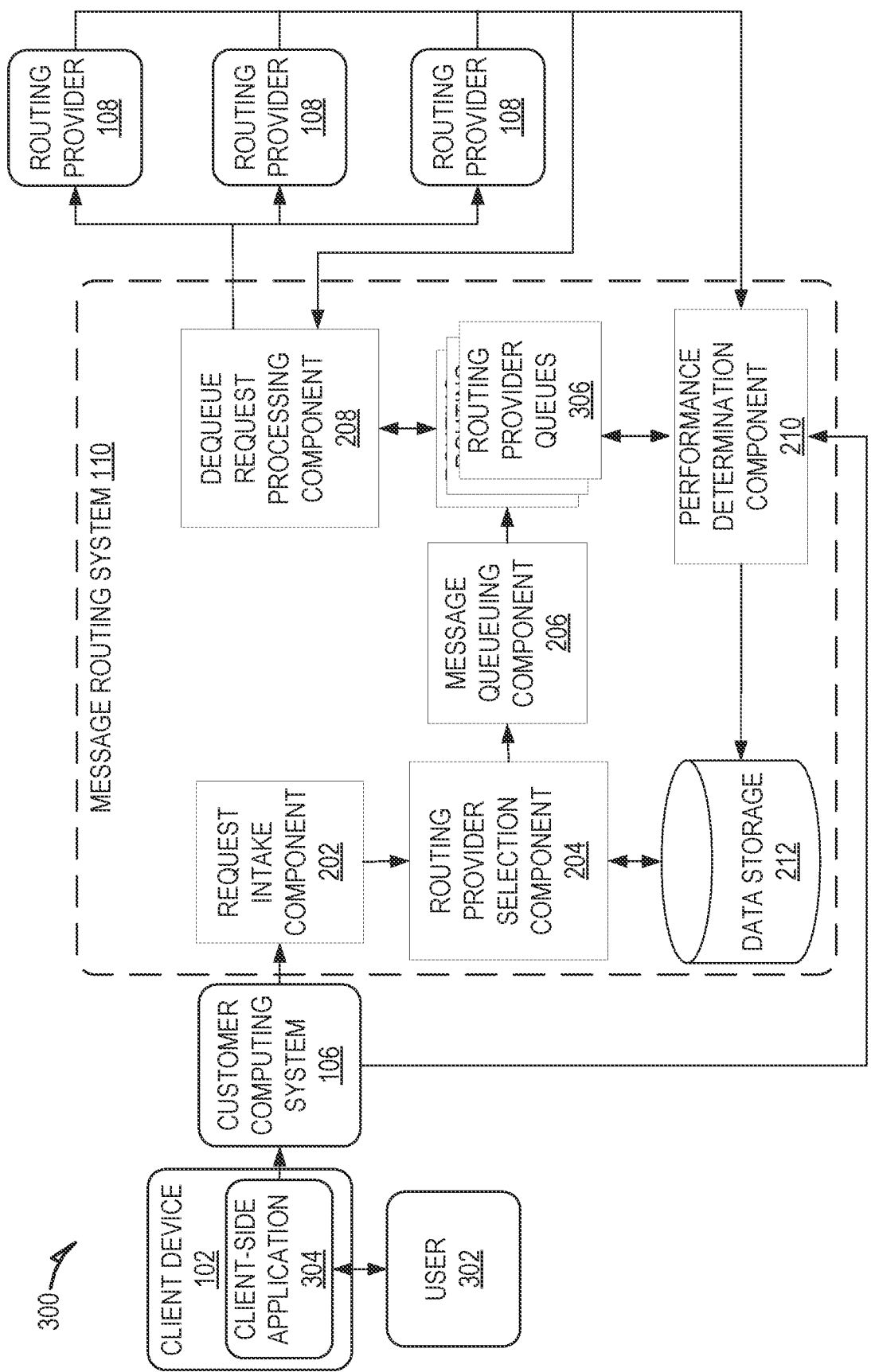
FIG. 3 shows communications within a system for allocating messages using routing provider queues, according to some example embodiments.

FIG. 3 shows communications within a system 300 for allocating messages using routing provider queues, according to some example embodiments. To avoid obscuring the inventive subject matter with unnecessary detail, various functional components (e.g., modules, devices, databases, etc.) that are not germane to conveying an understanding of the inventive subject matter have been omitted from FIG. 3. However, a skilled artisan will readily recognize that various additional functional components may be supported by the system 300 to facilitate additional functionality that is not specifically described herein. Furthermore, the various functional components depicted in FIG. 3 may reside on a single computing device or may be distributed across several computing devices in various arrangements such as those used in cloud-based architectures.

As shown, a user 302 uses a client-side application 304 installed on a client device 102 to utilize the functionality of a customer computing system 106. The customer may provide any type of service, such as a banking service, travel service, retail service, and the like. The service may be an online and/or offline service. That is, the service may be available only online, such as an online retailer, offline, such as a physical retailer, or both online and offline, such as a retailer that provides a website or application as well as a physical retail store.

The customer computing system 106 may transmit messages as part of its provided services. For example, the customer computing system 106 may allow the user 302 to transmit messages to an agent of the customer, transmit messages to other users 302, request a message be transmitted to the client device 102 to provide information, password reset, etc. The customer computing system 106 may also transmit messages that are not in response to a request made by a user 302. For example, the customer computing system 106 may transmit messages to provide a user 302 with a notification, marketing materials, etc.

The customer may use the functionality of the message routing system 110 that provides optimized message routing performance. The message routing system 110 provides optimized message routing performance by allocating messages to routing providers 108 based on a determined performance level of the routing providers 108 as well as a cost charged by each routing provider 108 and/or customer criteria provided by the customer. For example, the message routing system 110 allocates messages to the routing providers 108 based performance levels determined based on a conversation rate and current congestion level of each routing provider 108.

To utilize the functionality of the message routing system 110, the customer computing system 106 transmits a request to the message routing system 110 to transmit a message to an intended recipient. The request may include data identifying the recipient of the message. For example, the request may include a phone number or other contact identifier associated with the recipient.

The request is received by the request intake component 202 of the message routing system 110. The request intake component 202 provides the received request to the routing provider selection component 204.

The routing provider selection component 204 selects a routing provider 108 to deliver the message based on various factors, such as the cost to deliver messages with each routing provider 108, a determined performance level of each routing provider 108, customer criteria, and the like. The determined performance level of each routing provider indicates a level at which each routing provider 108 is performing based on one or more metrics, such as a conversion rate of the routing provider 108, a congestion level of the routing provider 108, and the like. The customer criteria indicate preferences of the customer that is requesting to transmit the message. For example, the customer criteria may define a maximum price the customer is willing to pay to transmit messages, a minimum performance level for delivering the message, and the like.

The routing provider selection component 204 may gather the cost to deliver messages with each routing provider 108, the determined performance level of each routing provider 108, and/or the customer criteria from the data storage 212. The routing provider selection component 204 may then use the gathered data to select a routing provider 108 to deliver the message. For example, the routing provider selection component 204 may select a routing provider 108 that charges a cost that is below the maximum price that the customer is willing to pay and a provides a performance level that is greater than the minimum performance level defined by the customer. In some embodiments, the routing provider selection component 204 may select a routing provider 108 that provides an optimized value based on a combination of cost and performance level.

The routing provider selection component 204 provides the message queueing component 206 with data identifying the routing provider 108 that was selected to deliver the message. The message queueing component 206 adds the message to the routing provider queue 306 designated to the selected routing provider 108. Adding the message to the routing provider queue 306 may include adding data used to deliver the message, such as data identifying the source and recipient of the message. The message payload or an identifier identifying the location of the message payload may also be added to the routing provider queue 306. The message payload may include text to be transmitted as part of the message, as well as media or other content (e.g., voice, video, audio, etc.) to be included in the message.

Messages are allocated to a routing provider 108 from the routing provider queue 306 designated to the routing provider 108. For example, the dequeue request processing component 208 receives dequeue requests from the routing providers 108. A dequeue request indicates that the routing provider 108 from which the dequeue request was received is ready to receive and process a new message. For example, a routing provider 108 may transmit a dequeue request when an available bandwidth level of the routing provider 108 is greater than a threshold bandwidth. The dequeue request may include data identifying the routing provider 108 and or the routing provider queue designated to the routing provider 108. For example, the dequeue request may include a unique identifier associated with the routing provider 108 and/or the routing provider queue 306.

In response to receiving a dequeue request, the dequeue request processing component 208 allocates a message to the routing provider 108 from the routing provider queue 306 designated to the routing provider 108. For example, the dequeue request processing component 208 uses the identifier included in the dequeue request to identify the routing provider queue 306 designated to the routing provider 108 and then dequeues a message from the routing provider queue 306. Messages are dequeue from each routing provider queue 306 in the order in which they were added to the routing provider queue 306. The dequeue request processing component 208 then provides the dequeued message to the routing provider 108 for delivery to its intended recipient.

The performance determination component 210 determines the performance levels of the routing providers 108 based on various data. For example, the, performance determination component 210 may determine the performance levels based on feedback data indicating whether messages transmitted by the routing providers 108 were successfully delivered as well as data describing performance of the routing provider queues 306 designated to the routing providers 108.

As shown, the performance determination component 210 may receive feedback data from the routing providers 108 and/or customer computing systems 106 indicating whether the messages allocated to the routing providers 108 were successfully delivered to their intended recipient devices (e.g., successfully received by the intended recipient devices). The performance determination component 210 may use the received feedback data to calculate a conversion rate for each routing provider 108. The conversion rate may indicate the percentage of messages allocated to a routing provider 108 that were successful delivered.

In addition to calculating a conversion rate for each routing provider 108, the performance determination component 210 may also determine a current congestion level of each routing provider 108. The current congestion level for each routing provider 108 indicates a current throughput or available bandwidth of the routing provider 108. For example, a high congestion level may indicate that the routing provider 108 has a low throughput or available bandwidth that may result in an increase in latency related to delivering messages. Alternatively, a low congestion level may indicate that the routing provider 108 has a high throughput or available bandwidth such that messages allocated to the routing provider 108 are delivered quickly or with minimal latency.

The performance determination component 210 determines the congestion level of each routing provider 108 by monitoring the routing provider queue 306 designated to each routing provider 108. For example, the performance determination component 210 may monitor the rate at which messages are dequeued from each routing provider queue and/or the rate at which dequeue requests are received for each routing provider queue. The performance determination component 210 uses this rate to determine the current congestion level of the corresponding routing provider 108.

The performance determination component 210 determines the performance level of each routing provider 108 based on a combination of the conversion rate and the congestion rate of the routing provider 108. For example, the performance determination component 210 may calculate a score indicating the performance level of each provider 108 based on the conversion rate and the congestion rate of the routing provider 108.

As shown, the performance determination component 210 may store the performance level of each routing provider 108 in the data storage 212. The stored performance levels may be accessed from the data storage 212 by other components of the message routing system 110. For example, the routing provider selection component 204 may access the performance levels of the routing providers 108 from the data storage 212 when allocating messages to the routing providers 108.

Figure 4:
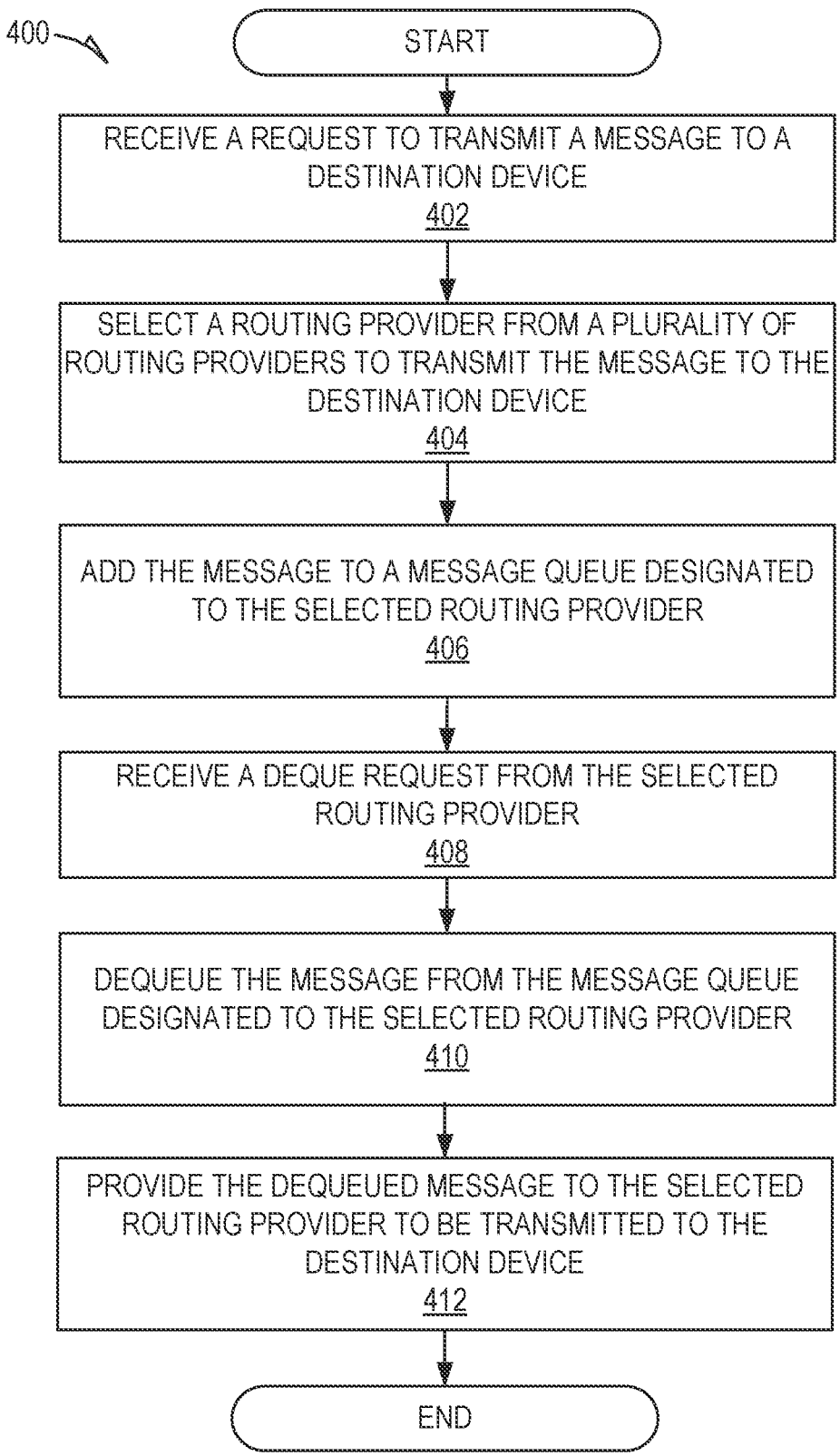
FIG. 4 is a flow diagram of a method for allocate messages to routing providers using designated routing provider queues, according to some example embodiments.

FIG. 4 is a flow diagram of a method 400 to allocate messages to routing providers 108 using designated routing provider queues, according to some example embodiments. The method 400 may be embodied in computer readable instructions for execution by one or more computer processors such that the operations of the method 400 may be performed in part or in whole by the message routing system 110; accordingly, the method 400 is described below by way of example with reference to the message routing system 110. However, it shall be appreciated that at least some of the operations of the method 400 may be deployed on various other hardware and/or software configurations and the method 400 is not intended to be limited to the message routing system 110.

At operation 402, the request intake component 202 receives a request to transmit a message to a destination device. The request intake component 202 receives requests to deliver a message for a customer. For example, the request intake component 202 may receive the request from a customer computing system 106. The request may be transmitted as a result of a user utilizing the online functionality provided by the customer computing system 106. For example, a user may use a client device 102 to communicate with and utilize the functionality of the customer computing system 106, which may involve transmission of the message. For example, a user may request to login to an account, resulting in transmission of a message to provide two-factor authentication. As another example, a user may initiate transmitting a message to an agent of the customer or another user. Alternatively, the request may be transmitted by the customer computing system 106 to provide functionality that is not in direct response to a user use of an online service. For example, the request may be transmitted by the customer computing system 106 to provide promotional materials or updates to users.

The request may include data identifying the customer, data identifying the intended recipient, and/or a payload of the message. For example, the request may include a unique identifier assigned to the customer and/or the customer's account with the message routing system 110. The request may also include an identifier for the recipient of the message, such as a phone number associated with a recipient client device 102, an account of the message routing system 110 associated with the recipient, etc. The payload may include any of a variety of types of data, including text, images, rich media format of data and/or any combination of data formats but not limited to the above formats to be included in the message provided to the recipient.

At operation 404, the routing provider selection component 204 selects a routing provider from a plurality of routing providers to transmit the message to the destination device. The routing provider selection component 204 may select a routing provider based on various factors, such as the cost to deliver messages with each routing provider 108, a determined performance level of each routing provider 108, customer criteria, and the like. The determined performance level of each routing provider indicates a level at which each routing provider 108 is performing based on one or more metrics, such as how likely the routing provider 108 is to successfully deliver a message to its intended recipient, a congestion level of the routing provider 108, and the like. The customer criteria indicate preferences of the customer that is requesting to transmit the message. For example, the customer criteria may define a maximum price the customer is willing to pay to transmit messages, a minimum performance level for delivering the message, and the like.

The routing provider selection component 204 may gather the cost to deliver messages with each routing provider 108, the determined performance level of each routing provider 108, and/or the customer criteria from the data storage 212. The routing provider selection component 204 may then use the gathered data to select a routing provider 108 to deliver the message. For example, the routing provider selection component 204 may select a routing provider 108 that charges a cost that is below the maximum price that the customer is willing to pay and a provides a performance level that is greater than the minimum performance level defined by the customer. In some embodiments, the routing provider selection component 204 may select a routing provider 108 that provides an optimized value based on a combination of cost and performance level.

The routing provider selection component 204 provides the message queueing component 206 with data identifying the routing provider 108 that was selected to deliver the message. At operation 406, the message queueing component 206 adds the message to a message queue designated to the selected routing provider. Adding the message to the routing provider queue may include adding data used to deliver the message, such as data identifying the source and recipient of the message. The message payload or an identifier identifying the location of the message payload may also be added to the routing provider queue. The message payload may include text to be transmitted as part of the message, as well as media or other content (e.g., voice, video, audio, etc.) to be included in the message. Messages added to the routing provider queue are allocated to the routing provider 108 for delivery to their intended recipients.

At operation 408, the dequeue request processing component 208 receives a dequeue request from the selected routing provider. A dequeue request indicates that the routing provider 108 from which the dequeue request was received is ready to receive and process a new message. For example, a routing provider 108 may transmit a dequeue request when the available bandwidth of the routing provider 108 is greater than a threshold bandwidth. The dequeue request may include data identifying the routing provider 108 and or the routing provider queue designated to the routing provider 108. For example, the dequeue request may include a unique identifier associated with the routing provider 108 and/or the routing provider queue.

At operation 410, the dequeue request processing component 208 dequeues the message from the message queue designated to the selected routing provider. In response to receiving a dequeue request, the dequeue request processing component 208 allocates a message to the routing provider 108 from the routing queue designated to the routing provider 108. For example, the dequeue request processing component 208 uses the identifier included in the dequeue request to identify the routing provider queue designated to the routing provider 108 and then dequeues a message from the routing provider queue. Messages are dequeue from the routing provider queue in the order in which they were added to the routing provider queue.

At operation 412, the dequeue request processing component 208 provides the dequeued message to the selected routing provider to be transmitted to the destination device.

Figure 5:
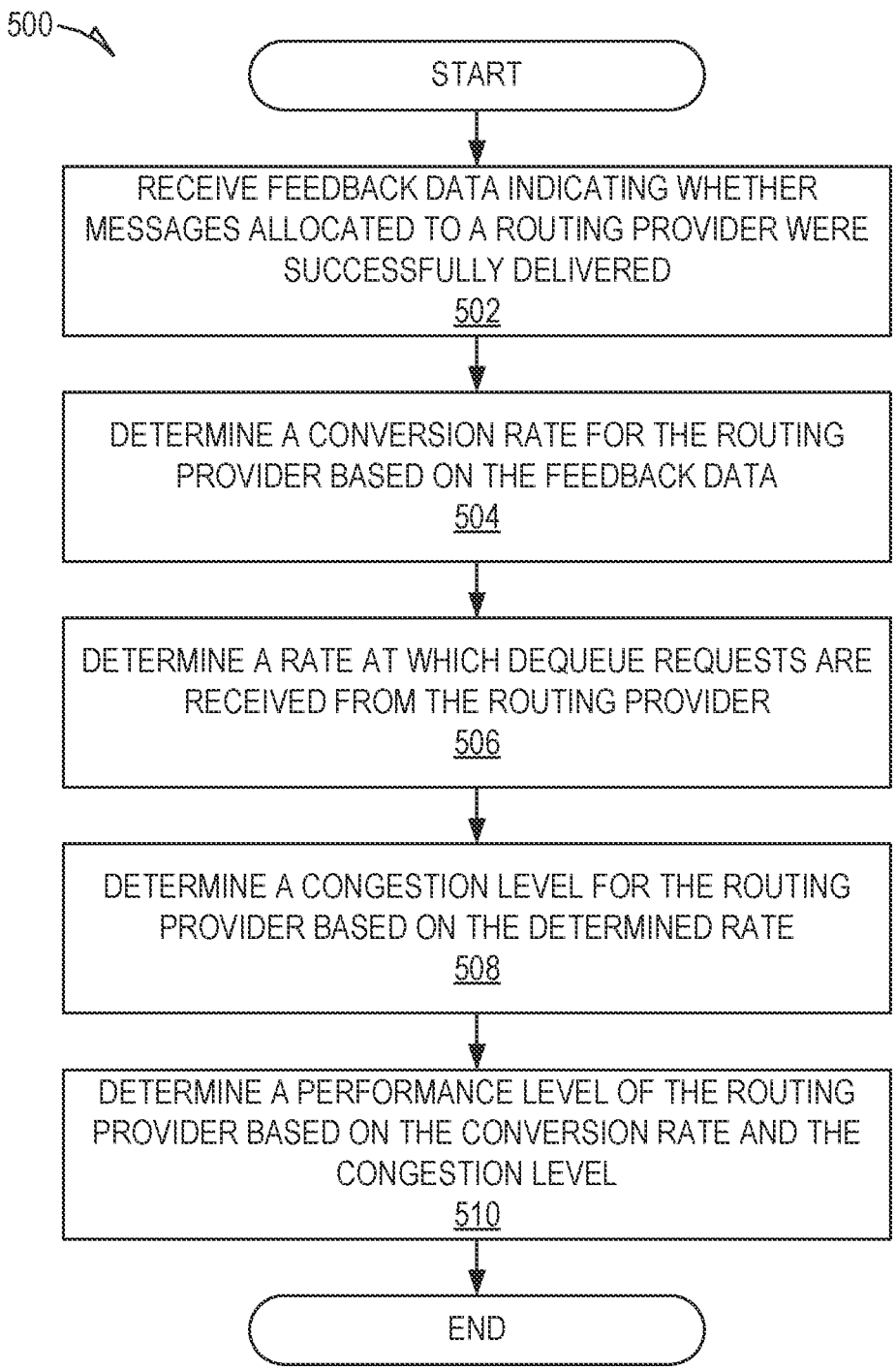
FIG. 5 is a flow diagram of a method for determined a performance level of a routing provider, according to some example embodiments.

FIG. 5 is a flow diagram of a method 500 to determine a performance level of a routing provider 108, according to some example embodiments. The method 500 may be embodied in computer readable instructions for execution by one or more computer processors such that the operations of the method 500 may be performed in part or in whole by the message routing system 110; accordingly, the method 500 is described below by way of example with reference to the message routing system 110. However, it shall be appreciated that at least some of the operations of the method 500 may be deployed on various other hardware and/or software configurations and the method 500 is not intended to be limited to the message routing system 110.

At operation 502, the performance determination component 210 receives feedback data indicating whether messages allocated to a routing provider 108 were successfully delivered. The performance determination component 210 may receive feedback data from the routing providers 108 and/or customer computing systems 106 indicating whether the messages allocated to the routing providers 108 were successfully delivered to their intended recipient devices (e.g., successfully received by the intended recipient devices).

At operation 504, the performance determination component 210 determines a conversion rate for the routing provider 108 based on the feedback data. The conversion rate may indicate the percentage of messages allocated to a routing provider 108 that were successful delivered. The performance determination component 210 may calculate the conversion rate for a routing provider 108 based on all of the feedback data associated with the routing provider 108 or a subset of the feedback data. For example, the performance determination component 210 may calculate the conversion rate using a sliding window of the feedback data, such as the feedback data received within a previous two-hour window. Using a sliding window of the feedback data to calculate the conversion rate results in a conversion rate that better represents a routing provider's 108 current performance.

At operation 506, the performance determination component 210 determines a rate at which dequeue requests are received from the routing provider 108. For example, the performance determination component 210 may monitor the rate at which messages are dequeued from each routing provider queue and/or the rate at which dequeue requests are received for each routing provider queue.

At operation 508, the performance determination component 210 determines a congestion level for the routing provider 108 based on the determined rate. The current congestion level for each routing provider 108 indicates a current throughput or available bandwidth of the routing provider 108. For example, a high congestion level may indicate that the routing provider 108 has a low throughput or available bandwidth that may result in an increase in latency related to delivering messages. Alternatively, a low congestion level may indicate that the routing provider 108 has a high throughput or available bandwidth such that messages allocated to the routing provider 108 are delivered quickly or with minimal latency.

The performance determination component 210 uses the rate at which messages are dequeued from each routing provider queue and/or the rate at which dequeue requests are received for each routing provider queue to determine the current congestion level of the corresponding routing provider 108. For example, a decreased or lower rate at which messages are dequeued from the routing provider queue may indicate that the routing provider 108 is experiencing an increase in congestion. As another example, an increase or higher rate at which messages are dequeued from the routing provider queue may indicate that the routing provider 108 is experiencing a decreasing and/or low level of congestion.

As the congestion level of each routing provider 108 may change quickly due to various factors, the performance determination component 210 may use recent data to determine a current congestion level of each routing provider 108. For example, the performance determination component 210 may determine the congestion level of each routing provider 108 based on sliding window of data, such as data gathered within a previous ten minutes. Using a sliding window provides an accurate reflection of the current congestion level being experienced by each routing providers 108, which increases the performance of the message routing system 110 when allocating messages to a routing provider 108.

At operation 510, the performance determination component 210 determines a performance level of the routing provider 108 based on the conversion rate and the congestion level. For example, the performance determination component 210 may calculate a score indicating the performance level of each provider 108 based on the conversion rate and the congestion rate of the routing provider 108. The performance determination component 210 may calculate the performance level using any of a variety of algorithms. For example, the performance determination component 210 may use the current congestion level of a routing provider 108 as a weight value applied to the conversion rate of the routing provider 108. This is just one example and is not meant to be limiting. The performance determination component 210 may calculate the performance level in any of a variety of ways.

Software Architecture

Figure 6:
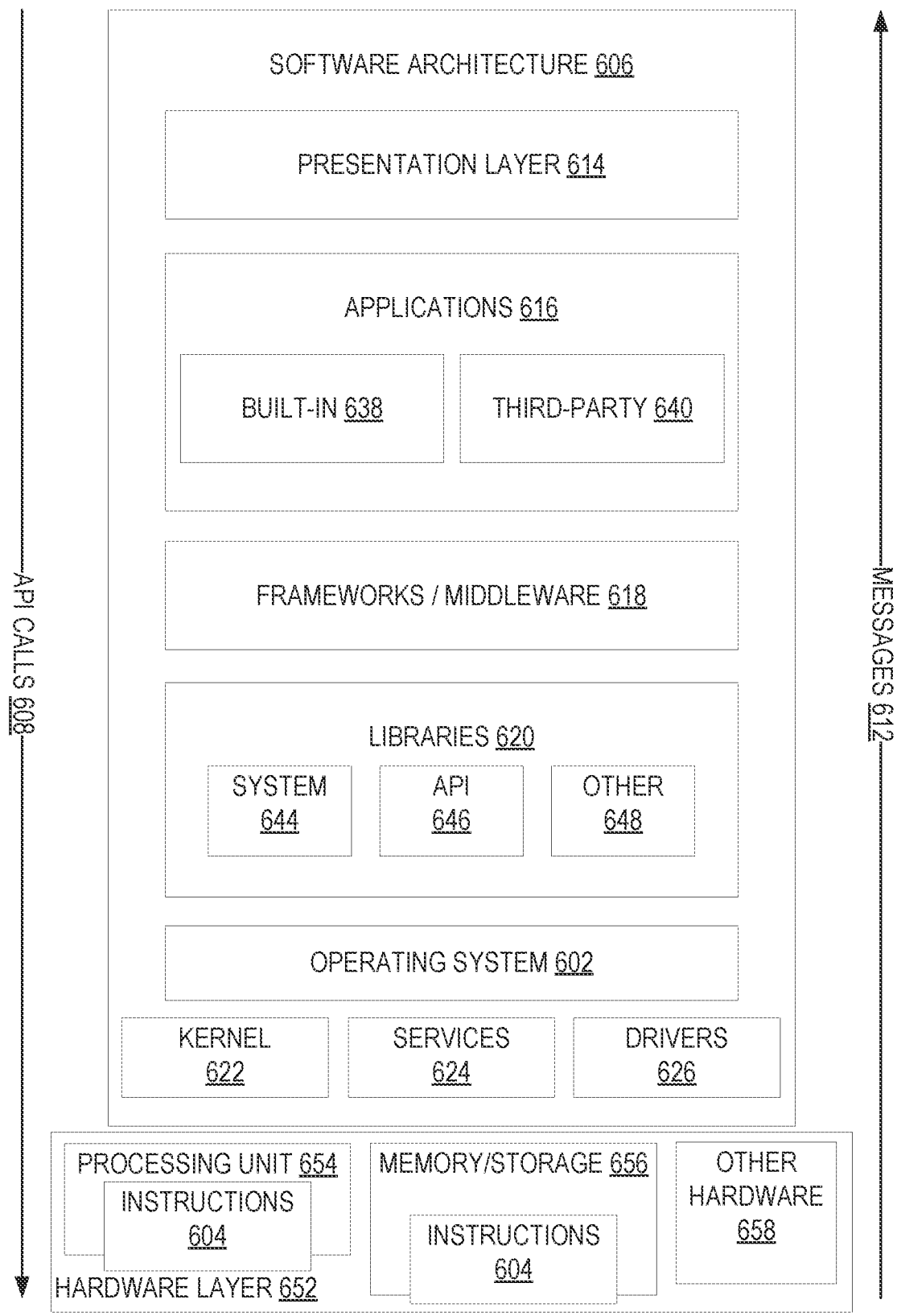
FIG. 6 is a block diagram illustrating components of a machine, according to some example embodiments, able to read instructions from a machine-readable medium (e.g., a machine-readable storage medium) and perform any one or more of the methodologies discussed herein.

FIG. 6 is a block diagram illustrating an example software architecture 606, which may be used in conjunction with various hardware architectures herein described. FIG. 6 is a non-limiting example of a software architecture 606 and it will be appreciated that many other architectures may be implemented to facilitate the functionality described herein. The software architecture 606 may execute on hardware such as machine 700 of FIG. 7 that includes, among other things, processors 704, memory 714, and (input/output) I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components, and so forth described herein. The hardware layer 652 also includes memory and/or storage modules 656, which also have executable instructions 604. The hardware layer 652 may also comprise other hardware 658.

In the example architecture of FIG. 6, the software architecture 606 may be conceptualized as a stack of layers where each layer provides particular functionality. For example, the software architecture 606 may include layers such as an operating system 602, libraries 620, frameworks/middleware 618, applications 616, and a presentation layer 614. Operationally, the applications 616 and/or other components within the layers may invoke application programming interface (API) calls 608 through the software stack and receive a response such as messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624, and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphical user interface (GUI) functions, high-level resource management, high-level location services, and so forth. The frameworks/middleware 618 may provide a broad spectrum of other APIs that may be used by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624, and/or drivers 626), libraries 620, and frameworks/middleware 618 to create UIs to interact with users of the system. Alternatively, or additionally, in some systems, interactions with a user may occur through a presentation layer, such as presentation layer 614. In these systems, the application/component "logic" can be separated from the aspects of the application/component that interact with a user.

Figure 7:
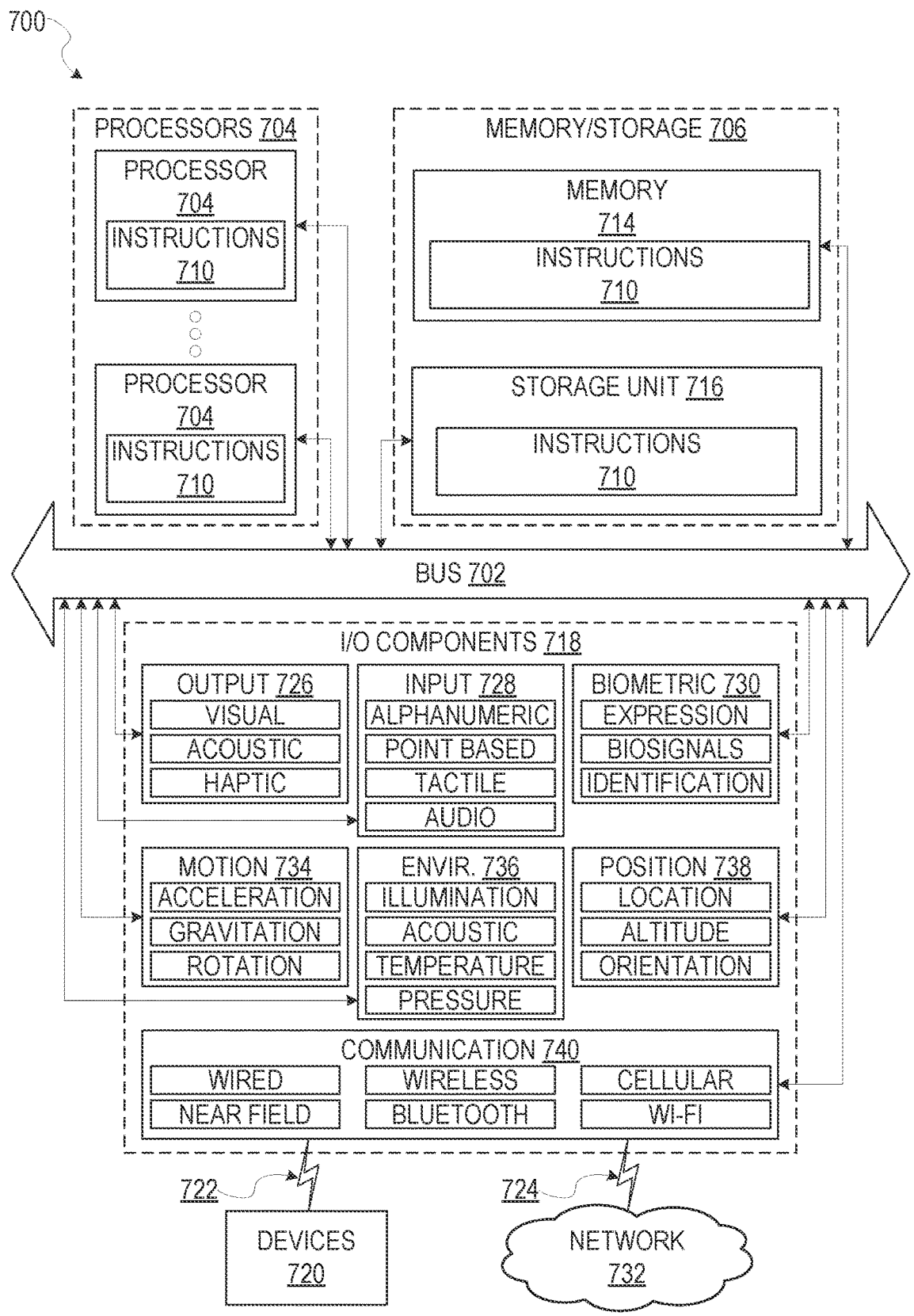
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions 604 from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 700 capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 730, motion components 734, environmental components 736, or position components 738 among a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environmental components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 732 or devices 720 via coupling 724 and coupling 722, respectively. For example, the communication components 740 may include a network interface component or other suitable device to interface with the network 732. In further examples, communication components 740 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a USB).

Moreover, the communication components 740 may detect identifiers or include components operable to detect identifiers. For example, the communication components 740 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 710 for execution by the machine 700, and includes digital or analog communications signals or other intangible medium to facilitate communication of such instructions 710. Instructions 710 may be transmitted or received over the network 732 using a transmission medium via a network interface device and using any one of a number of well-known transfer protocols.

"CLIENT DEVICE" in this context refers to any machine 700 that interfaces to a communications network 732 to obtain resources from one or more server systems or other client devices 102, 104. A client device 102, 104 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 732.

"COMMUNICATIONS NETWORK" in this context refers to one or more portions of a network 732 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 732 or a portion of a network 732 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 710 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 710. The term "machine-readable medium" shall also be taken to include any medium, or combination of multiple media, that is capable of storing instructions 710 (e.g., code) for execution by a machine 700, such that the instructions 710, when executed by one or more processors 704 of the machine 700, cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 704) may be configured by software (e.g., an application 616 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 704 or other programmable processor 704. Once configured by such software, hardware components become specific machines 700 (or specific components of a machine 700) uniquely tailored to perform the configured functions and are no longer general-purpose processors 704. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 704 configured by software to become a special-purpose processor, the general-purpose processor 704 may be configured as respectively different special-purpose processors (e.g., comprising different hardware components) at different times. Software accordingly configures a particular processor or processors 704, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 702) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 704 that are temporarily configured (e.g., by software) or permanently configured to perform the relevant operations. Whether temporarily or permanently configured, such processors 704 may constitute processor-implemented components that operate to perform one or more operations or functions described herein. As used herein, "processor-implemented component" refers to a hardware component implemented using one or more processors 704. Similarly, the methods described herein may be at least partially processor-implemented, with a particular processor or processors 704 being an example of hardware. For example, at least some of the operations of a method may be performed by one or more processors 704 or processor-implemented components. Moreover, the one or more processors 704 may also operate to support performance of the relevant operations in a "cloud computing" environment or as a "software as a service" (SaaS). For example, at least some of the operations may be performed by a group of computers (as examples of machines 700 including processors 704), with these operations being accessible via a network 732 (e.g., the Internet) and via one or more appropriate interfaces (e.g., an API). The performance of certain of the operations may be distributed among the processors 704, not only residing within a single machine 700, but deployed across a number of machines 700. In some example embodiments, the processors 704 or processor-implemented components may be located in a single geographic location (e.g., within a home environment, an office environment, or a server farm). In other example embodiments, the processors 704 or processor-implemented components may be distributed across a number of geographic locations.

"PROCESSOR" in this context refers to any circuit or virtual circuit (a physical circuit emulated by logic executing on an actual processor 704) that manipulates data values according to control signals (e.g., "commands," "op codes," "machine code," etc.) and which produces corresponding output signals that are applied to operate a machine 700. A processor 704 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 704 may further be a multi-core processor having two or more independent processors 704 (sometimes referred to as "cores") that may execute instructions 710 contemporaneously.

What is claimed is:

1. A method comprising:
   receiving, at a message routing system, a request of a user of the message routing system to transmit a message to a destination device, wherein the destination device is a client device of a recipient;
   selecting, at the message routing system, a first routing provider from a plurality of routing providers to transmit the message of the user to the client device of the recipient, wherein the message routing system, coupled to each of the plurality of routing providers via a network, maintains a separate message queue of a plurality of message queues for each of the plurality of routing providers, and wherein the first routing provider is selected to transmit the message of the user to the client device of the recipient based at least on performance data of each of the plurality of routing providers, the performance data indicating a rate at which messages are dequeued from each message queue at the message routing system to a corresponding routing provider;

adding, at the message routing system, the message into a first message queue designated to the first routing provider;

receiving, by the message routing system and from the first routing provider, a dequeue request indicating that the first routing provider has available bandwidth exceeding a predefined threshold, to process a new message;

responsive to the dequeue request, determining, by the message routing system and based on a predefined order, that the message is to be dequeued from the first message queue designated to the first routing provider; and dequeuing, by the message routing system, the message from the first message queue to the first routing provider for delivery to the client device of the recipient.

2. The method of claim 1,
wherein the performance data further comprises a subset of the performance data calculated using a sliding window of the rate at which messages are dequeued from each message queue.

3. The method of claim 1, wherein selecting the first routing provider from the plurality of routing providers is further based on a cost to deliver messages associated with each routing provider of the plurality of routing providers.

4. The method of claim 1, wherein selecting the first routing provider from the plurality of routing providers is further based on conversion rates determined for the plurality of routing providers.

5. The method of claim 2, further comprising:
determining, based on the subset of the performance data associated with the first message queue, a congestion level of the first routing provider.

6. The method of claim 5, wherein determining the congestion level of the first routing provider comprises:
determining the congestion level of the first routing provider based on a rate at which dequeued messages are received from the first routing provider.

7. A system comprising:
one or more computer processors; and
one or more computer-readable mediums storing instructions that, when executed by the one or more computer processors, cause the one or more computer processors to perform operations comprising:
receiving, at a message routing system, a request of a user of the message routing system to transmit a message to a destination device, wherein the destination device is a client device of a recipient;
selecting, at the message routing system, a first routing provider from a plurality of routing providers to transmit the message of the user to the client device of the recipient, wherein the message routing system, coupled to each of the plurality of routing providers via a network, maintains a separate message queue of a plurality of message queues for each of the plurality of routing providers, and wherein the first routing provider is selected to transmit the message of the user to the client device of the recipient based at least on performance data of each of the plurality of routing providers, the performance data indicating a rate at which messages are dequeued from each message queue at the message routing system to a corresponding routing provider;

adding, at the message routing system, the message into a first message queue designated to the first routing provider;

receiving, by the message routing system and from the first routing provider, a dequeue request indicating that the first routing provider has available bandwidth exceeding a predefined threshold, to process a new message;

responsive to the dequeue request, determining, by the message routing system and based on a predefined order, that the message is to be dequeued from the first message queue designated to the first routing provider; and dequeuing, by the message routing system, the message from the first message queue to the first routing provider for delivery to the client device of the recipient.

8. The system of claim 7,
wherein the performance data further comprises a subset of the performance data calculated using a sliding window of the rate at which messages are dequeued from each message queue.

9. The system of claim 7, wherein selecting the first routing provider from the plurality of routing providers is further based on a cost to deliver messages associated with each routing provider of the plurality of routing providers.

10. The system of claim 7, wherein selecting the first routing provider from the plurality of routing providers is further based on conversion rates determined for the plurality of routing providers.

11. The system of claim 8, the operations further comprising:
determining, based on the subset of the performance data associated with the first message queue, a congestion level of the first routing provider.

12. The system of claim 11, wherein determining the congestion level of the first routing provider comprises:
determining the congestion level of the first routing provider based on a rate at which dequeue messages are receive from the first routing provider.

13. A non-transitory computer-readable medium storing instructions that, when executed by one or more computer processors of one or more computing devices, cause the one or more computer processors to perform operations comprising:
receiving, at a message routing system, a request of a user of the message routing system to transmit a message to a destination device, wherein the destination device is a client device of a recipient;
selecting, at the message routing system, a first routing provider from a plurality of routing providers to transmit the message of the user to the client device of the recipient, wherein the message routing system, coupled to each of the plurality of routing providers via a network, maintains a separate message queue of a plurality of message queues for each of the plurality of routing providers, and wherein the first routing provider is selected to transmit the message of the user to the client device of the recipient based at least on performance data of each of the plurality of routing providers, the performance data indicating a rate at which messages are dequeued from each message queue at the message routing system to a corresponding routing provider;

adding, at the message routing system, the message into a first message queue designated to the first routing provider;

receiving, by the message routing system and from the first routing provider, a dequeue request indicating that the first routing provider has available bandwidth exceeding a predefined threshold, to process a new message;

responsive to the dequeue request, determining, by the message routing system and based on a predefined order, that the message is to be dequeued from the first message queue designated to the first routing provider; and dequeuing, by the message routing system, the message from the first message queue to the first routing provider for delivery to the client device of the recipient.

14. The non-transitory computer-readable medium of claim 13, wherein the performance data further comprises a subset of the performance data calculated using a sliding window of the rate at which messages are dequeued from each message queue.

15. The non-transitory computer-readable medium of claim 13, wherein selecting the first routing provider from the plurality of routing providers is further based on a cost to deliver messages associated with each routing provider of the plurality of routing providers.

16. The non-transitory computer-readable medium of claim 13, wherein selecting the first routing provider from the plurality of routing providers is further based on conversion rates determined for the plurality of routing providers.

17. The non-transitory computer-readable medium of claim 14, the operations further comprising:

determining, based on the subset of the performance data associated with the first message queue, a congestion level of the first routing provider.

18. The non-transitory computer-readable medium of claim 17, wherein determining the congestion level of the first routing provider comprises:

determining the congestion level of the first routing provider based on a rate at which dequeue messages are received from the first routing provider.

* * * * *